United States Patent
Mosko

(10) Patent No.: US 8,050,205 B2
(45) Date of Patent: Nov. 1, 2011

(54) SLOT ADAPTATION IN A WIRELESS DYNAMIC TDMA NETWORK WITH RESERVATIONS

(75) Inventor: Marc E. Mosko, Santa Cruz, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 189 days.

(21) Appl. No.: 12/504,168

(22) Filed: Jul. 16, 2009

(65) Prior Publication Data

US 2011/0013526 A1    Jan. 20, 2011

(51) Int. Cl.
*H04B 7/00* (2006.01)
(52) U.S. Cl. ........................................... 370/310
(58) Field of Classification Search .................. 370/310, 370/312, 328–330, 345–349; 455/295, 296
See application file for complete search history.

(56) References Cited

U.S. PATENT DOCUMENTS

| | | | |
|---|---|---|---|
| 6,823,005 B1 | 11/2004 | Chuang | |
| 6,912,215 B1* | 6/2005 | Lin et al. | 370/347 |
| 6,958,986 B2* | 10/2005 | Cain | 370/337 |
| 6,993,002 B2* | 1/2006 | Pan et al. | 370/335 |
| 7,149,205 B2* | 12/2006 | Nakamura et al. | 370/343 |
| 7,813,373 B2* | 10/2010 | Joshi et al. | 370/458 |
| 2007/0274320 A1* | 11/2007 | Joshi et al. | 370/395.2 |
| 2009/0034446 A1* | 2/2009 | Adams et al. | 370/314 |

OTHER PUBLICATIONS

Bernhardt, Richard C. et al., "Automatic Time-Slot Reassignment in a Frequency Reuse TDMA Portable Radio System", IEEE Transactions on Vehicular Technology, vol. 41, No. 3, Aug. 1992, pp. 296-304.
Qui, Xiaoxin et al., "Link Adaptation in Wireless Data Networks for Throughput Maximization under Retransmissions", pp. 1272-1277, IEEE xplore.
Chuang, Justin C. I. et al., "Performance of Autonomous Dynamic Channel Assignment and Power Control for TDMA/FDMA Wireless Access", IEEE Journal on Selected Areas in Communications, vol. 12, No. 8, Oct. 1994.

* cited by examiner

*Primary Examiner* — Dmitry H Levitan
(74) *Attorney, Agent, or Firm* — Shun Yao; Park, Vaughan, Fleming & Dowler LLP

(57) ABSTRACT

One embodiment of the present invention provides a system for performing wireless slot adaptation with reservations in a time division multiple access (TDMA) network where time is divided into time slots in repeated frames. During operation, the system receives a vector from a neighbor node, wherein a respective element in the vector indicates received signal quality for a corresponding time slot in a frame with respect to that neighbor node. Next, the system updates a record which indicates the received signal quality for all the time slots within a frame for the neighbor node based on the received vector. The system then determines a transmission threshold for a time slot with respect to a neighbor node based on the record. Subsequently, the system transmits a packet destined for the neighbor node in an outbound queue if the record indicates that the received signal quality in an upcoming slot is better than the transmission threshold.

18 Claims, 4 Drawing Sheets

SLOT ADAPTATION IN A WIRELESS DYNAMIC TDMA NETWORK WITH RESERVATIONS

BACKGROUND

1. Field

This disclosure is generally related to slot assignment and reservation in a wireless dynamic TDMA network. More specifically, this disclosure is related to a method and an apparatus to facilitate slot adaptation with reservations by measuring the quality of time slots and sharing the slot quality information with neighbors in a wireless dynamic TDMA network.

2. Related Art

In a wireless dynamic TDMA network, time slots are assigned to nodes in a changing sequence. Such networks are used in wireless multihop data networks and are distinct from wireless cellular TDMA networks. In situations where nodes cannot communicate or are otherwise unaware of each other but share the same channel, these random sequences will likely overlap between non-communicating groups and cause intermittent signal interference. Depending on topology, this interference may be more or less persistent. In such a network, however, if reservations are used, the interference might become persistent and repetitive. In the worst case, interfering nodes choose to reserve the same slot, and the performance of that slot becomes unacceptably low.

Previous works on time slot assignment and re-assignment looks primarily at signal-to-interference and noise ratios (SINR), power control, frequency channel, or modulation as the system parameters. For example, in order to re-assign a wireless device between time slots on the same channel when there is high co-channel interference, the wireless device scans frequencies to find one with a good signal-to-interference ratio (SIR), and requests the found time slot from the base station. Upon decoding the request, the base station acknowledges the request and confirms the link. The base station continues monitoring the signal quality on its side and making adjustments based on its local information.

Most of these works are unrelated to the specific problem domain we consider, which is a common-channel wireless ad hoc data network with random time slot assignments using persistent time slot reservations, particularly when those time slot reservations are not dedicated to a specific flow between fixed neighbors. Hence, there is a need for a method and an apparatus for efficient slot adaptation with reservations by measuring the quality of time slots and sharing the slot quality information with neighbors in a wireless dynamic TDMA network. Based on the shared state, nodes may choose preferred time slots to reserve and avoid transmitting data on other slots with high interference.

SUMMARY

One embodiment of the present invention provides a system for performing wireless slot adaptation with reservations in a time division multiple access (TDMA) network where time is divided into time slots in repeated frames. During operation, the system receives a vector from a neighbor node, wherein a respective element in the vector indicates received signal quality for a corresponding time slot in a frame with respect to that neighbor node. Next, the system updates a record which indicates the received signal quality for all the time slots within a frame for the neighbor node based on the received vector. The system then determines a transmission threshold for a time slot with respect to a neighbor node based on the record. Subsequently, the system transmits a packet destined for the neighbor node in an outbound queue if the record indicates that the received signal quality in an upcoming slot is better than the transmission threshold. The system further determines a reservation threshold for a time slot with respect to a neighbor node based on the record, and reserves the time slot for future transmissions to the neighbor node if the record indicates that the received signal quality in that time slot is better than the reservation threshold.

In one variation of this embodiment, a respective element in the vector is an absolute scale indicating the received signal quality.

In one variation of this embodiment, a respective element in the vector is a relative quartile scale indicating the received signal quality.

In one variation of this embodiment, the neighbor node uses a moving average to compute an average slot quality.

In a further variation of this embodiment, the neighbor node ranks average slot quality for different slots in an relative scale.

In a further variation of this embodiment, the neighbor node ranks average slot quality for different slots in an absolute scale indicating slot quality.

In a further variation of this embodiment, the system uses the top 75% slots for transmission In a further variation of this embodiment, the system uses the top 25% slots for reservations.

In one variation of this embodiment, the system terminates the reservation of the time slot with a predetermined probability when the historical received signal health indicated by the record drops below the reservation threshold.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Figure 1:
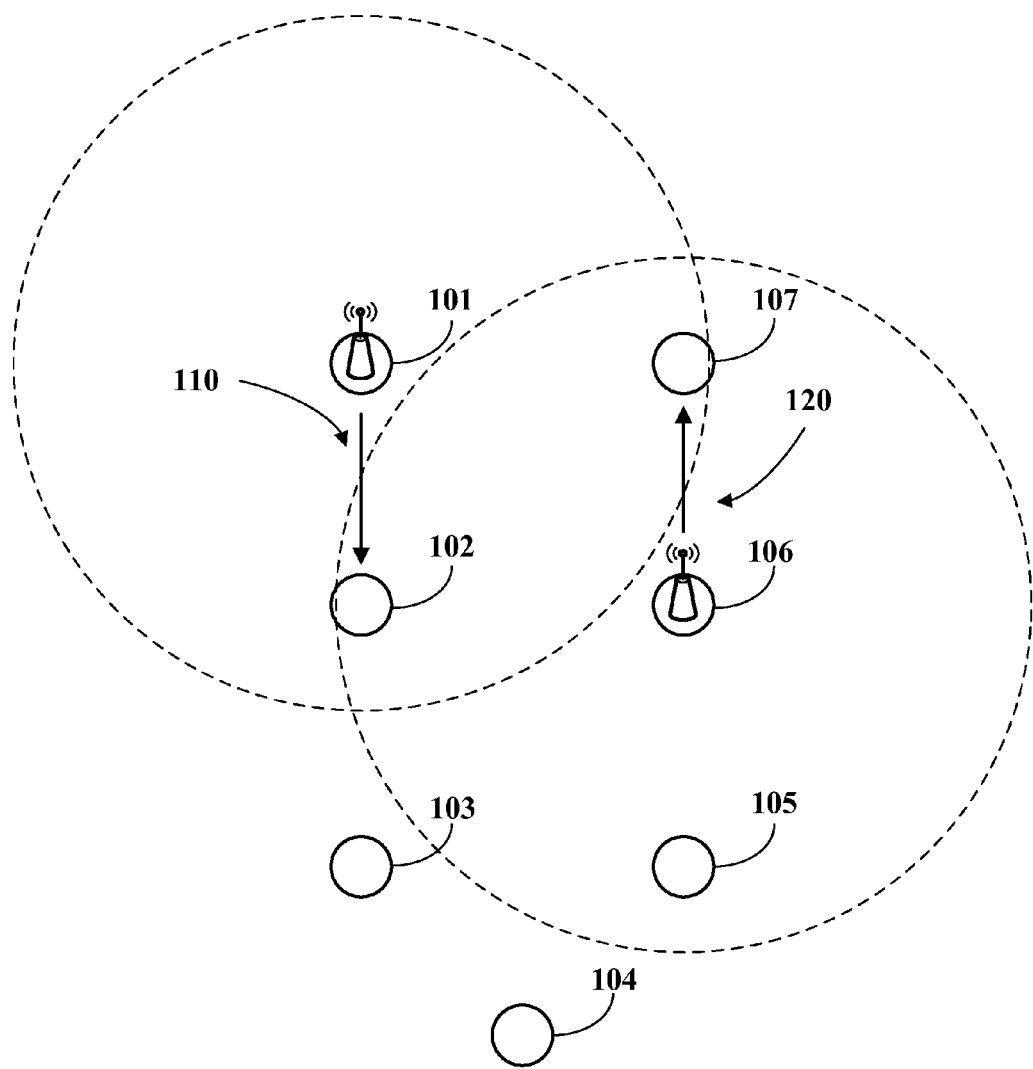
FIG. 1 illustrates a wireless dynamic TDMA network with 7 nodes where two non-communicating groups have a time-slot reservation conflict.

FIG. 1 illustrates a wireless ad hoc time division multiple access (TDMA) network with 7 nodes 101-107. Node 101 is transmitting packets to node 102, while node 106 is transmitting packets to node 107. Node 103, 104, and 105 are idle at the moment. Node 101 and node 106 are out of each other's transmission range. Therefore, node 101 and node 102 form a first communicating group 110, and node 106 and node 107 form a second communicating group 120. These two groups are not communicating with each other. However, node 102 is within the transmission range of both node 101 and node 106, and node 107 is within the transmission range of both node 106 and node 101. In situations where both node 101 and node 106 are transmitting at the same time, intermittent signal interference may occur, which will cause receiving problems at both node 102 and node 107.

Figure 2:
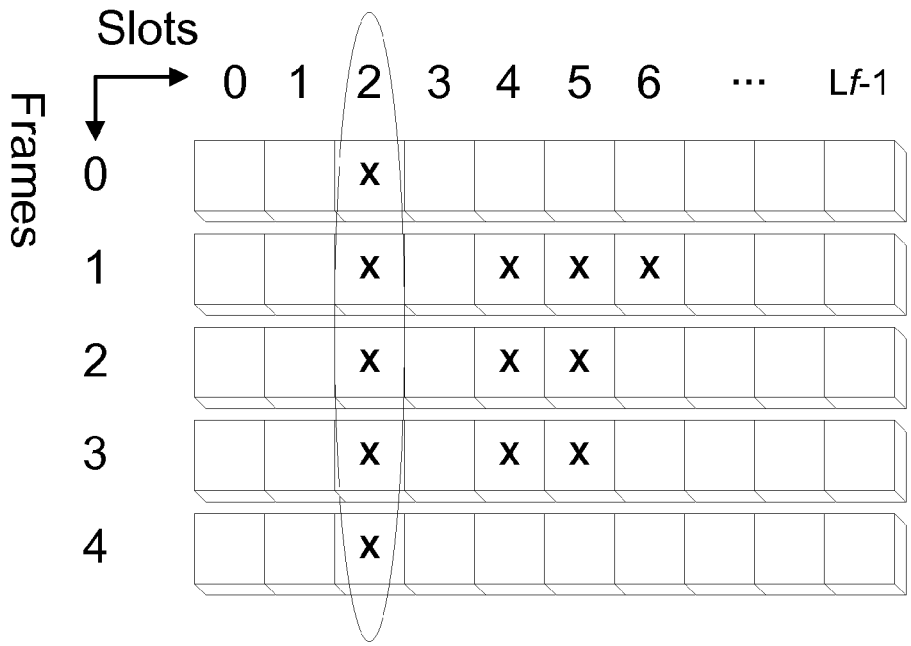
FIG. 2 illustrates the time-slot usage patterns in a sequence of frames, in accordance with an embodiment of the present invention.

FIG. 2 illustrates the time-slot usage patterns in a sequence of frames, in accordance with an embodiment of the present invention. As illustrated in FIG. 2, in a TDMA network, time is divided into repeated frames numbered from zero to four shown vertically. Each time frame is further divided into a fixed number of $L_f$ slots with sequence numbers from zero to ($L_f$-1) shown horizontally. Time slots are assigned to nodes in a changing sequence. An assigned time slot is marked by an "x" in it. In case slot reservation can be used, and the two non-communicating groups 110 and 120 in FIG. 1 have both reserved time slot 2 in all the frames, which leads to an unforeseen reservation conflict with each other, the signal interference at node 102 and node 107 in FIG. 1 may become persistent and repetitive. To address this problem, a slot adaptation protocol is necessary where nodes measure the quality of time slots and share that information in a local neighborhood. Based on the shared information, nodes may choose preferred time slots to reserve and may avoid transmitting data in other slots with high interference.

The goal of the protocol is to give us a statistical basis to make three decisions: should a slot be used for a given neighbor, should a node make a reservation for a slot, and should a node release a reservation for a slot. The criterion we use to make these decisions is the quartile rank of a slot's quality over all slots in a history of frames. This coarse ranking of slots provides sufficient discrimination to avoid using the particularly bad slot in general and only use the better slots for a reservation.

Slot Quality Algorithm

Each node in the network monitors its received signal quality for each time slot, and label the slot quality simply as one of three states (Good, Bad, Neutral; G, B, N hereafter). If a node correctly decoded received signal in a time slot, the slot is labeled Good. If the node failed to decode the signal, the slot is labeled Bad. Otherwise, the slot is labeled Neutral, which includes cases where the node itself is in transmission mode or the received signal is below a given threshold. Each node aggregates the slot quality and disseminates this aggregated slot quality information to all of its adjacent neighbors in periodic control packets. Using this control information, a node may compute a moving average of the historical signal quality of a slot for each neighbor and use that moving average to select good slots for communicating with a neighbor and for reservations.

One embodiment of the present invention distributes the moving average of slot quality with a binary encoding of the ternary GBN data in variable-length messages. Each message is a vector containing one or more fixed-size segments. In one embodiment, a segment encodes 40 slots, and its length is 64 bits long because 64 bits can hold 64·ln 2/ln 3=40.8 ternary symbols. The message also contains the number of segments in the vector followed by the segments. A node maintains a timer to periodically broadcast the update message to all its adjacent neighbors.

Another embodiment of the present invention communicates between nodes an indication of relative slot quality. We choose a quartile approach to make use of the slot quality information, where the first quartile has the top 25% time slots with the best quality; the second quartile has the time slots in the 25%-50% range; the third quartile is in the range 50%-75%; and the fourth quartile are the time slots in the bottom 25%. For each neighbor j, node i set a transmission threshold, say, the upper 75% for random elected slots and a reservation threshold, say, the upper 25% for future transmissions. Using this terminology, time slots with the lower quartile ranks are better.

This quartile ranking approach makes sure that each node will use the relatively "best" slots available for a neighbor, even if those slots are of poor quality in an absolute sense.

Assume all nodes have relatively well-synchronized time such that all nodes agree on a common frame number and slot number, both of which we take as monotonically increasing with the true time t. Let the function $f(t)$ be the frame number for time t and s(t) be the slot number at time t. Each frame includes a fixed number M of slots; therefore, $s(t) \in [0, M-1]$.

A node i monitors its transceiver and encodes the received signal quality of each slot as G, B, or N. This encoded value at time t is stored in a history buffer $M_i$ (f mod h, s), where f is the frame number and s is the slot number. In practice, we use a circular buffer to store h frames of the current and historical data. Based on the history, a node computes a weighted quality for each slot s and then ranks each slot by its quality quartile, storing the result in $B_{i,j}[s]$. In one embodiment the weighted sum is computed as:

$$S_i[s] = \sum_{j=0}^{k-1} M_i(f(t) - j, s) \cdot \alpha^j$$

for all updated slots. The factor $\alpha \in (0, 1]$ is used to weigh more on recent frames than older frames. In some instances $\alpha=1$, so all frames are treated equally.

Periodically, a node broadcasts a control packet stating the quartile rank of each slot since the last time it broadcast an update. This method uses two bits per slot. In an example network with 400 slots per frame, there are 100 bytes of data per frame. Considering guard intervals, there may be about 650 bytes of user data per slot. Therefore, this scheme takes about 15% of one slot per frame per node as an overhead. An alternative system could use an absolute scale ranking, such as GNB, or simply GB, instead of sending the quartile ranks, which are on a relative scale. The GNB ranking could encode 40 slot qualities in 64 bits with a ternary encoding, or 12.3% of one slot per frame in overhead. A GB ranking would use only one bit per slot, or about 7.5% of one slot per frame.

Each node i also receives slot quality update messages from its adjacent neighbors. There may be losses due to interference or fading, but no provision for reliable delivery is made. When a node i receives such a message from a neighbor j at time t, it stores the update in $B_{i,j}[s(t)]$, where t is the current time, and then counts backwards in frame/slot time over the entries in the control message.

Upon receiving an update message containing the weighted sum vector $S_i[\ ]$, each node computes a histogram of the values in the vector, which ranges in $[-hK_b, hK_g]$. To find the hinge points in the histogram, the following values are computed:

$$H_1 = \text{round}\left(\frac{L_f + 1}{4}\right),$$

the median $H_2$, and $$H_3 = \text{round}\left(\frac{3L_f + 3}{4}\right).$$

The algorithm executed at each node to compute its own quartile ranks is incremental with a minimum number of iterations to keep the hinge points updates. The algorithm begins with $B_i[\ ]$ initialized to a know value, so the hinge locations are also known at initialization. Because each update removes and inserts a value in the histogram, we can simply shift hinge locations depending on the location relative to the insert or remove locations.

Figure 3:
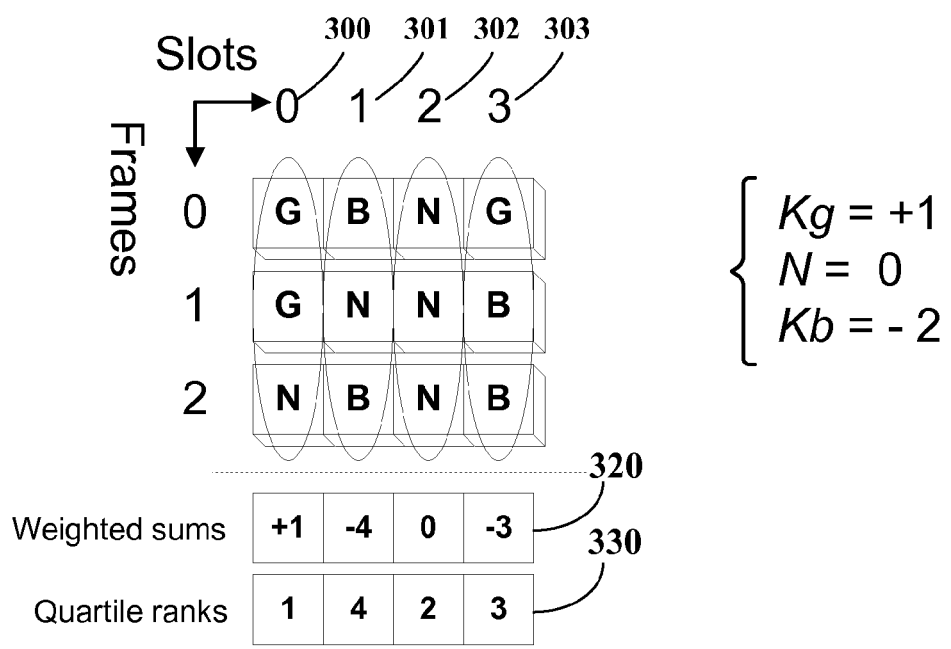
FIG. 3 illustrates vectors of labels in a record of time slot quality, in accordance with an embodiment of the present invention.

FIG. 3 illustrates an exemplary record of slot quality at a node. The record contains three frames and four slots in each frame. If we set the corresponding weight of $K_g=+1, K_b=-2$, and factor $\alpha=1$, the weighted sums 320 for slots 300, 301, 302 and 303 are +1, -4, 0, and -3, respectively. Therefore the quartile rankings 330 are: slot 300 is in the first quartile, slot 302 the second quartile, slot 303 the third quartile, and slot 301 the last. The quartile ranking of the slots can also be remapped to GBN data.

Slot Adaptation with Reservation

Figure 4:
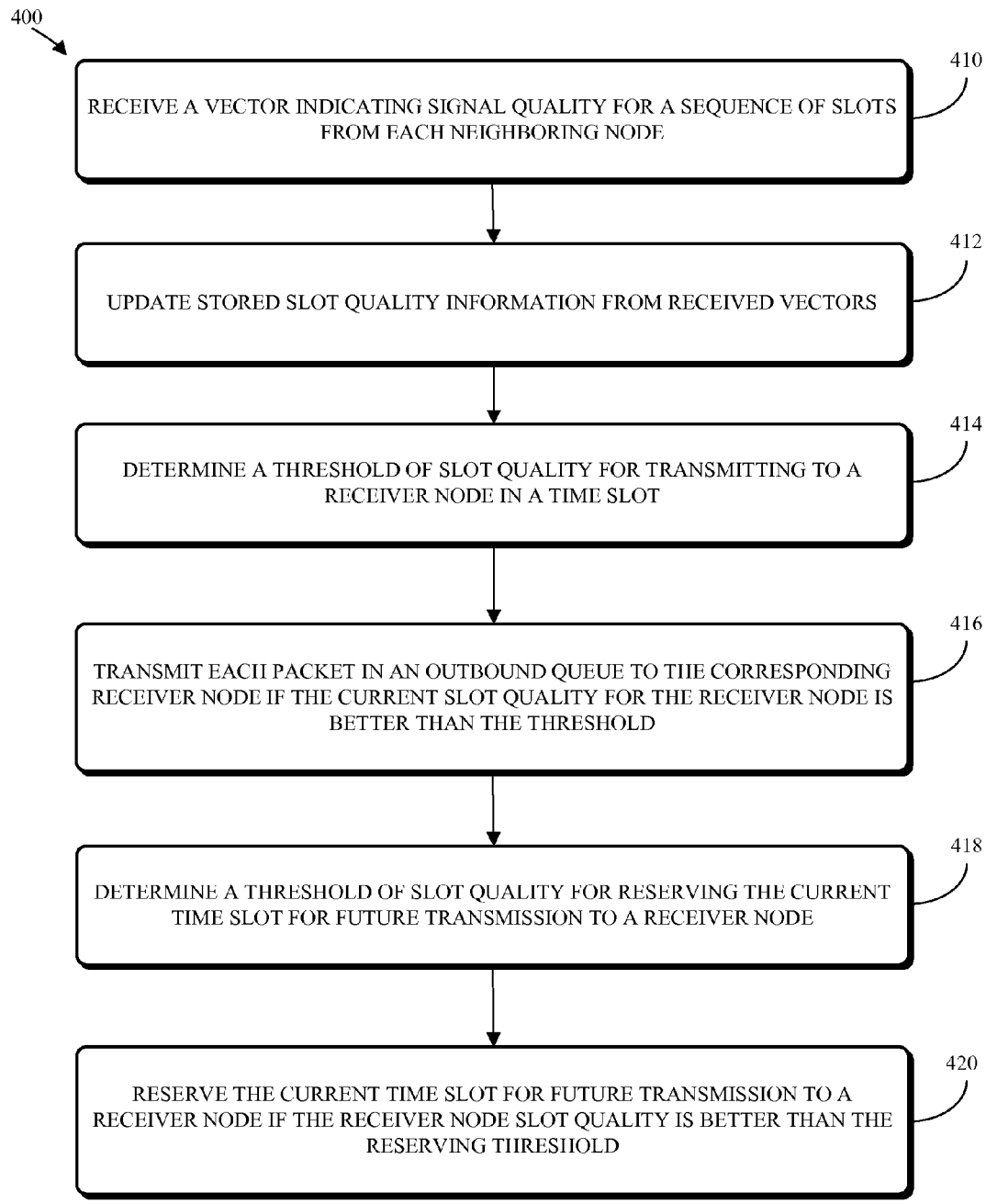
FIG. 4 presents a flowchart illustrating an exemplary process of slot adaptation with reservations, in accordance with an embodiment of the present invention.

We now describe embodiments of a process for slot adaptation with reservations that answers the three questions posed earlier. FIG. 4 presents a flowchart illustrating a process 400 for slot adaptation with reservations in a wireless ad-hoc network. During operation, the system receives a vector from a neighbor node, wherein a respective element in the vector indicates received signal quality for a corresponding time slot in a frame with respect to that neighbor node (operation 410). Next, the system updates a record which indicates the received signal quality for all the time slots within a frame for the neighbor node based on the received vector (operation 412). The system then determines a transmission threshold for a time slot with respect to a neighbor node based on the record (operation 414). Subsequently, the system transmits a packet destined for the neighbor node in an outbound queue if the record indicates that the received signal quality in an upcoming slot is better than the transmission threshold (operation 416). The system further determines a reservation threshold for a time slot with respect to a neighbor node based on the record (operation 418), and reserves the time slot for future transmissions to the neighbor node if the record indicates that the received signal quality in that time slot is better than the reservation threshold (operation 420).

For each packet in the outbound queue identified by the pair (nexthop, priority), the transmitting node determines the quartile rank of the present slot for nexthop. If the quartile rank is greater than the transmission threshold, the packet is skipped in the outbound buffer. A typical value for the threshold might be four, to avoid using the bottom fourth quartile of slots.

In any given time slot at time t, a node wishes to transmit to a set of nodes identified by the pairs (nexthop, priority). We consider two methods to determine whether time slot t should be reserved.

Average Method: compute the weighted average quartile of time slot t using the priorities as weights. If the average quartile is not more than the reservation threshold, the slot is suitable for reservation.

Good-for-one Method: if the slot quality quartile for at least one nexthop node is not more than the reservation threshold, the slot may be reserved.

In one embodiment, when a node needs to determine whether it should maintain a reservation, it repeats the reservation calculation shown in the above. When the historical received signal health indicated by the record drops below the reservation threshold, the node terminates the reservation of the time slot with a predetermined probability.

Figure 5:
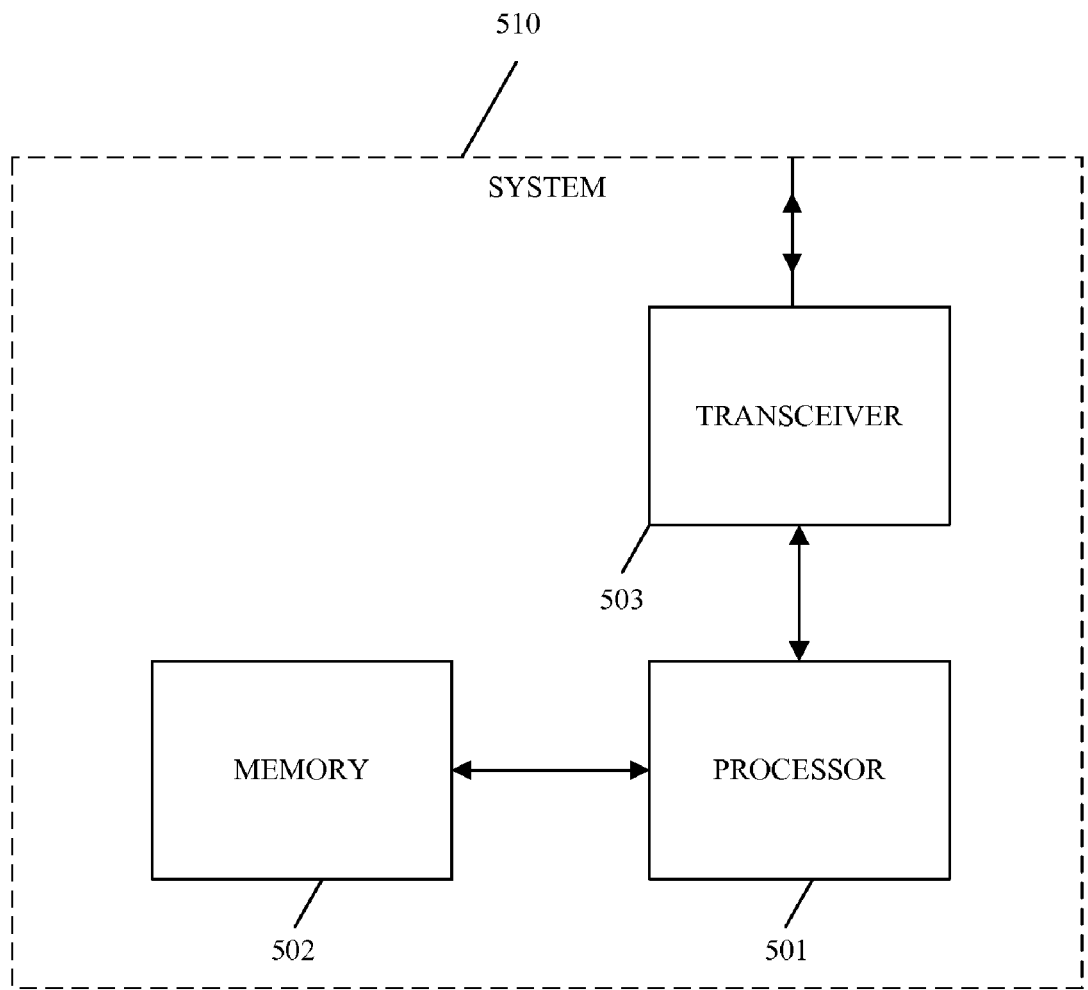
FIG. 5 illustrates an exemplary system architecture of a node in the dynamic TDMA network performing slot adaptation, in accordance with an embodiment of the present invention.

FIG. 5 illustrates a wireless communication system 510 that can perform the slot adaptation with reservations in a wireless ad hoc TDMA network. System 510 contains a processor 501, a memory 502, and a transceiver 503. A code is stored in memory 502 and executed by processor 501 to perform method described above for slot adaptation with reservations in a TDMA network. Transceiver 503 is configured to transmit and receive control and data packets necessary to carry out the slot adaptation mechanism. Other hardware and/or software configurations are also possible.

The data structures and code described in this detailed description are typically stored on a computer-readable storage device, which may be any device or medium that can store code and/or data for use by a computer system. The computer-readable storage device includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage device as described above. When a computer system reads and executes the code and/or data stored on the computer-readable storage device, the computer system performs the methods and processes embodied as data structures and code and stored within the computer-readable storage device.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing wireless slot adaptation with reservations in a time division multiple access (TDMA) network where time is divided into time slots in repeated frames, comprising:
   receiving a vector from a neighbor node, wherein a respective element in the vector indicates received signal quality for a corresponding time slot in a frame at the neighbor node;
   updating a record which indicates the received signal quality for all the time slots within a frame for the neighbor node based on the received vector;
   transmitting a packet destined for the neighbor node in an outbound queue if the record indicates that the received signal quality in a next available time slot for receiving at the neighbor node is better than a predetermined transmission threshold;

reserving a time slot for future transmissions to the neighbor node if the record indicates that the received signal quality in that time slot for receiving at the neighbor node is better than a predetermined reservation threshold.

2. The method of claim 1, wherein a respective element in the vector is an absolute scale indicating the received signal quality.

3. The method of claim 1, wherein a respective element in the vector is a relative scale indicating the received signal quality.

4. The method of claim 1, wherein the neighbor node uses moving average to compute an average slot quality.

5. The method of claim 4, wherein the neighbor node ranks average slot quality for different slots into quartiles based on a relative scale.

6. The method of claim 4, wherein the neighbor node ranks average slot quality for different slots in an absolute scale indicating slot quality.

7. The method of claim 4, wherein determining the transmission threshold involves using the top 75% slots for transmission.

8. The method of claim 4, wherein determining the reservation threshold involves using the top 25% slots for reservations.

9. The method of claim 1, further comprising terminating the reservation of the time slot with a predetermined probability when the updated received signal quality indicated by the record drops below the reservation threshold.

10. An apparatus for performing wireless slot adaptation with reservations in a TDMA network where time is divided into time slots in repeated frames, the apparatus comprising:

a receiving mechanism configured to receive a vector from a neighbor node, wherein a respective element in the vector indicates received signal quality for a corresponding time slot in a frame with respect to that neighbor node;

a recording mechanism configured to update a record which indicates the received signal quality for all the time slots within a frame for the neighbor node based on the received vector;

a transmission mechanism configured to transmit a packet destined for the neighbor node in an outbound queue if the record indicates that the received signal quality in a next available time slot for receiving at the neighbor node is better than a predetermined transmission threshold;

a reservation mechanism configured to reserve a time slot for future transmissions to the neighbor node if the record indicates that the received signal quality in that time slot for receiving at the neighbor node is better than a predetermined reservation threshold.

11. The apparatus of claim 10, wherein a respective element in the vector is an absolute scale indicating the received signal quality.

12. The apparatus of claim 10, wherein a respective element in the vector is a relative scale indicating the received signal.

13. The apparatus of claim 10, wherein the neighbor node uses moving average to compute an average slot quality.

14. The apparatus of claim 13, wherein the neighbor node ranks average slot quality for different slots into quartiles based on a relative scale.

15. The apparatus of claim 13, wherein the neighbor node ranks average slot quality for different slots in an absolute scale indicating slot quality.

16. The apparatus of claim 13, wherein while determining the transmission threshold, the first decision mechanism is further configured to use the top 75% slots for transmission.

17. The apparatus of claim 13, wherein while determining the reservation threshold, the second decision mechanism is further configured to use the top 25% slots for reservations.

18. The apparatus of claim 10, further comprises a termination mechanism configured to terminate the reservation of the time slot with a predetermined probability when the updated received signal quality indicated by the record drops below the reservation threshold.

* * * * *